May 8, 1945.  M. W. DUNNING  2,375,634
PRISM TELESCOPE
Filed Oct. 30, 1943
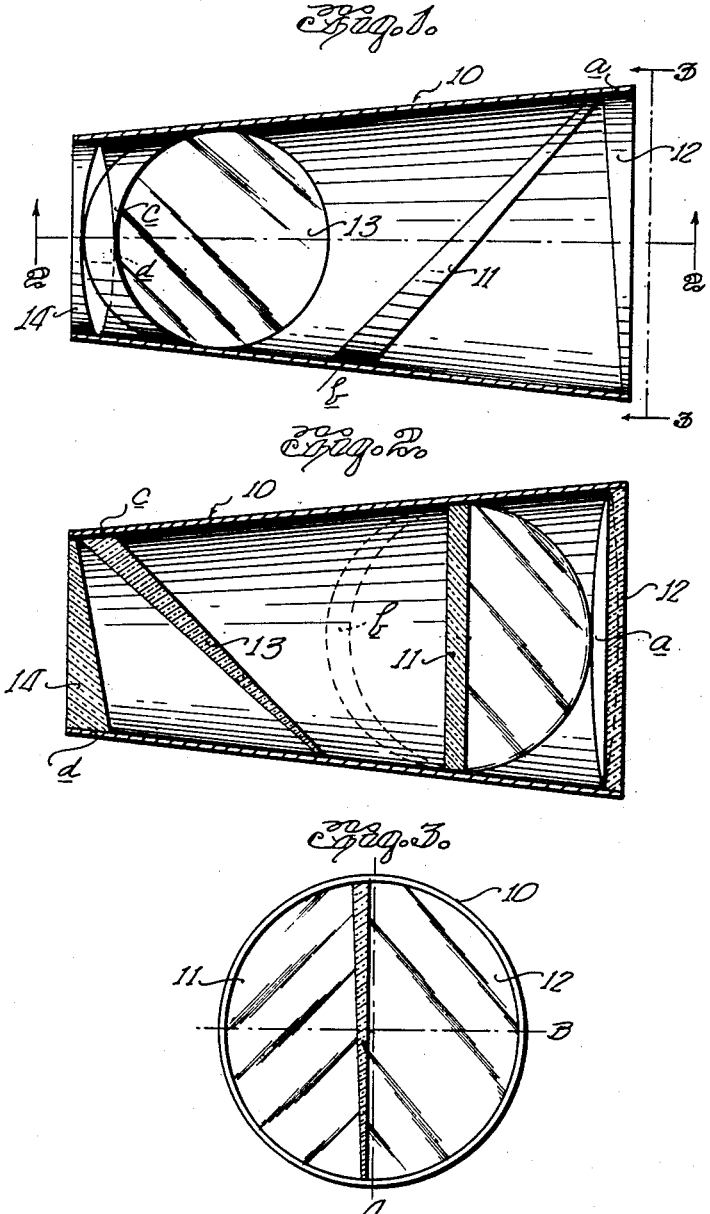
Mac W. Dunning
INVENTOR.
BY
ATTORNEY Patented May 8, 1945

2,375,634

UNITED STATES PATENT OFFICE 2,375,634

PRISM TELESCOPE

Mac W. Dunning, Dallas, Tex.

Application October 30, 1943, Serial No. 508,303

2 Claims. (Cl. 88—33)

This invention relates to telescopes and it has particular reference to a prismatic telescope.

The principal object of the invention is to provide an optical instrument for enlarging or diminishing the apparent size of objects without the use of spherical elements employed in the construction of binoculars, telescopes, gunsights, opera glasses and the like, and substitutes for the precision ground lenses of the conventional telescope, common wedge prisms which by virtue of their arrangement, are free from chromatic aberration and the necessity for complicated focal length adjustments, the focal length being infinite and correct for all distances, thus making the invention especially advantageous for use on gunsights by virtue of unlimited eye relief.

In all types of instruments for enlarging or diminishing the apparent size of a viewed image, even in the simplest form of practical telescope, there is provided a lens or lenses, scientifically ground and corrected for color aberration and in the more expensive telescopes and binoculars, the object glass or lens, which inverts the image is attended by reflecting prisms correcting the effect of the object lens and eye pieces which magnify the image. The elements of these complex instruments are, in practically all cases, movably mounted for focal adjustment.

It is therefore the chief object of the present invention to produce an inexpensive but highly effective telescope by so arranging plano prisms at an angle with respect to the optic axis that a change in the apparent size of an object or image is effected. Moreover, by associating with the angularly disposed prisms complementary prisms perpendicular to the optic axis, but whose individual axes are rotated 90° from that of the companion prisms, a correction factor is provided for displacement and color of the inclined prisms.

With the foregoing objects as paramount, the invention has particular reference to certain features of accomplishment which will become manifest as the description proceeds, taken in connection with the accompanying drawing wherein:

Figure 1 is a view in longitudinal section of a case containing an assembly of prisms arranged according to the invention.

Figure 2 is a similar view, rotated 90° but showing the prisms in diametrical section on line 2—2 on Figure 1, and Figure 3 is an end view of Figure 1 showing in broken lines the displaced axes of the prisms.

Continuing with a more detailed description of the drawing, reference is primarily made to Figure 1 wherein 10 denotes a shell or case of any cross-sectional design but preferably cylindrical, as shown. The case may take the form of a gunsight, telescope or binocular, depending upon the adaptation of the invention.

The chief use of prisms heretofore has been to bring about a change in the apparent position of an object when the latter is viewed therethrough or by means of reflection. In the present use of prisms, and since the change in apparent size of an image is directly proportional to the optical angle of the prism and its inclination to the optic axis, a planowedge prism 11 is disposed in the shell 10 with one of its oblique faces inclined at an angle of substantially 45° with respect to the center axis of the shell which is, in fact, the optic axis. It is understood that no limitation is intended by the specific mention of the angle of inclination since the power is proportional to the degree of inclination and the prism may be inclined for any desired power but when established, the prism is fixed in the shell.

Mounted in one end of the shell 10, immediately adjacent to prism 11 is a similar prism 12 whose refracting angle is the same but whose base $a$ is rotated 180° from the base $b$ of the complementary prism 11. The prism 12 is perpendicular to the optic axis and is a correction factor for displacement and color for the prism 11.

Mounted adjacent the prism 11 and inclined in the opposite meridian is a third prism 13, whose base $c$ is rotated 90° from the base $b$ of prism 11, creating the apparent change in size of an object in the plane in which it is inclined.

A correction factor for the displacement and color of the inclined prism 13 is present in a fourth prism 14, mounted in the opposite end of the mounting shell 10 and whose base $d$ is disposed diametrically opposite the base $c$ of prism 13 and rotated 90° from base $b$ of the inclined prism 11.

In Figure 3, the shell 10 is viewed from one end on line 3—3 but, for the sake of clarity, the first prism 12 is shown as being cut away on its vertical axis A to disclose the prism 11 immediately behind it whose axis B is at right angles to that of prism 12 and which, in view of its angular position, appears to be circular in shape but which in fact and of necessity is elliptical in form to conform to the walls of the shell in inclined position. This is true also of inclined prism 13.

It is obvious from the foregoing that a telescope or analogous instrument is afforded which has a vision range even greater than that of more expensive instruments and whose power may be varied by changing the angle of inclination of the instrument which is free from achromatic defects and the focal length fixed, therefore the need for focal adjustment is dispensed with.

Manifestly, the construction and process as shown and described is capable of some modification and such modification as may be construed to fall within the scope and meaning of the appended claims is also considered to be within the spirit and intent of the invention.

What is claimed is:

1. In a device of the character described, a casing, a pair of wedge prisms arranged in said casing, one of said prisms being perpendicular to the optic axis, the other prism being disposed at an angle with respect to the axis of said casing and the companion prism and whose apex is in juxtapositioned relation to the base of said companion prism, a second pair of wedge prisms, the plane of one of the pair being parallel with that of said first prism, the other of said pair being inclined with respect to the axis of said casing and to the companion prism of the latter pair, the common axes of each pair of prisms being rotated 90° with respect to that of the companion pair of prisms.

2. A device of the character described including a casing, a pair of planowedge prisms arranged in said casing, one prism of the pair being perpendicular with the axis of said casing, the other prism of the pair being disposed with its apex in juxtapositioned relation to the base of said perpendicular prism and inclined with respect to the axis of said casing, a second pair of planowedge prisms complementary to said first pair, one of the prisms of the second pair being perpendicular to the axis of the casing, but whose axis is rotated 90° with respect to that of said first prism, the other prism of the latter pair being at an angle to the plane of the companion prism of the latter pair and whose axis is rotated 90° with respect to that of the first inclined prism.

MAC W. DUNNING.